(12) United States Patent
Musku et al.

(10) Patent No.: US 8,787,217 B2
(45) Date of Patent: Jul. 22, 2014

(54) METHOD, APPARATUS AND COMPUTER PROGRAM PRODUCT FOR FAST RETRANSMISSION OF PROPOSAL MESSAGES

(75) Inventors: Amarender Musku, Santa Clara, CA (US); Simranjit Singh Chadha, Santa Clara, CA (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 603 days.

(21) Appl. No.: 13/007,917

(22) Filed: Jan. 17, 2011

(65) Prior Publication Data

US 2012/0182901 A1    Jul. 19, 2012

(51) Int. Cl.
*H04J 1/16*    (2006.01)
*H04L 12/28*    (2006.01)

(52) U.S. Cl.
USPC ............................ 370/282; 370/242; 370/252

(58) Field of Classification Search
USPC .................................. 370/278, 282, 252, 242
See application file for complete search history.

(56) References Cited

U.S. PATENT DOCUMENTS

| | | | |
|---|---|---|---|
| 7,480,258 B1 | 1/2009 | Shuen et al. | |
| 7,778,191 B2* | 8/2010 | Sun | 370/244 |
| 2004/0179524 A1* | 9/2004 | Sasagawa et al. | 370/389 |
| 2010/0110880 A1* | 5/2010 | Kulkarni et al. | 370/221 |
| 2010/0195661 A1* | 8/2010 | Thottakkara | 370/401 |
| 2011/0149738 A1* | 6/2011 | Rose | 370/235 |

OTHER PUBLICATIONS

"802.1D: IEEE Standard for Local and metropolitan area networks Media Access Control (MAC) Bridges", IEEE Computer Society, Jun. 9, 2004, the entire document.

\* cited by examiner

*Primary Examiner* — John Pezzlo (57) ABSTRACT

In one aspect, the invention provides a layer 2 network device that implements a fast retransmission method that causes the layer 2 network device to transmit proposal messages more frequently than defined in the RSTP standard. By transmitting proposal messages (e.g., proposal RST BPDUs) more frequently, the network device can significantly reduce the duration of a network traffic outage caused by a lost proposal message or a lost agreement message.

26 Claims, 10 Drawing Sheets

METHOD, APPARATUS AND COMPUTER PROGRAM PRODUCT FOR FAST RETRANSMISSION OF PROPOSAL MESSAGES

TECHNICAL FIELD

The invention relates to the retransmission of proposal messages.

BACKGROUND

For a device to communicate with another device over a network, the device typically needs to have what is called a "protocol stack," which may be implemented in hardware and/or software. A protocol stack is logically divided into a number of "layers." For example, the Internet Protocol (IP) protocol stack is divided into five logical layers: the physical layer (layer 1), the link layer (layer 2), the network layer (layer 3), the transport layer (layer 4) and the application layer (layer 5). For each layer, there is at least one corresponding protocol for that layer. For example, the Internet Protocol (IP) and Transmission Control Protocol (TCP) are protocols that correspond to the network layer and transport layer, respectively. In the Internet, Ethernet is a protocol that commonly corresponds to the link layer (layer 2).

A "layer 2" network device (L2D) is typically a device that operates on link layer protocol data units (PDUs) (e.g., examines and forwards link layer PDUs). A link layer PDU is a PDU generated by an entity (software and/or hardware) that implements the protocol associated with the link layer of the protocol stack. Examples of L2Ds are network bridges and network switches. As their name implies, a network bridge and a network switch generally serve the function of connecting together two or more network components. For instance, an L2D may connect a first local area network (LAN) (e.g., a point-to-point LAN) with another LAN (e.g., a shared media LAN). More specifically, an L2D typically includes at least two ports: a first port for connecting the L2D to a first LAN and a second port for connecting the L2D to a second LAN.

A network may comprise many LANs that are connected via a multitude of L2Ds. In such a network it is desirable to avoid network loops, as such loops can render the network unable to transport normal traffic. In order to prevent loops in such a network, a protocol known as the Spanning Tree Protocol (STP) was developed. The basic function of STP is to prevent loops and the ensuing broadcast radiation. STP requires that the L2Ds coordinate with each other to prevent network loops by communicating with each other using Bridge Protocol Data Units (BPDUs).

Rapid STP (RSTP) is an evolution of STP that provides for faster spanning tree convergence after a topology change. RSTP is defined in IEEE Std. 802.1D™-2004 (the "RSTP standard"), which is incorporated by this reference herein. Under RSTP, when a port of an L2D is activated (e.g., initialized, rebooted, comes up, etc.), the port is placed in a discarding state and the L2D transmits onto the LAN to which the port is connected a proposal RST BPDU (i.e., an RST BPDU that has the proposal flag set) (for RSTP to provide rapid convergence only one other L2D should be connected to the LAN). The L2D will not move the port to a forwarding state unless and until the L2D receives on that port an agreement RST BPDU (i.e., an RST BPDU having the agreement flag set) transmitted from the other L2D connected to the LAN in response to the proposal RST BPDU.

It is possible that the proposal RST BPDU will never reach the other L2D due to an error in the LAN. In such a case, the other L2D will not transmit a response (e.g., an agreement RST BPDU). Accordingly, under RSTP, if the L2D does not receive a response to the proposal RST BPDU within a predefined amount of time measured from when the proposal RST BPDU was transmitted, the L2D will immediately retransmit the RST BPDU. This predefined amount of time is referred to as the "Bridge Hello Time" (or "Hello Time" for short). The default value for the Hello Time is 2 seconds, and the "Compatibility Range" is 1.0-2.0 seconds. See IEEE Std. 802.1D™-2004 at table 17-1. More specifically, the Hello Time defines the interval between periodic transmissions of Configuration Messages (see id. at 17.13.6).

Accordingly, in the case where a proposal or agreement RST BPDU is lost, it will take at least 1 second for the network to recover from this failure, thereby delaying the L2D from being able to move the port from the discarding state to the functioning forwarding state by at least 1 second, which may result in a network traffic outage that lasts until the port is placed in the forwarding state.

There is a need, therefore, to decrease the amount of time it takes for a network to recover from a lost proposal or agreement RST BPDU.

SUMMARY

In one aspect, the invention provides an improved L2D that implements a fast retransmission method that causes the L2D to transmit a proposal message (e.g., a proposal RST BPDU) more frequently than defined in the RSTP standard. By transmitting a proposal message more frequently, the L2D can significantly reduce the duration of a network traffic outage caused by a lost proposal message or lost agreement message.

In one embodiment, an L2D configured for fast retransmission of proposal messages includes the following components: a first port, a second port, a data storage system; and a data processing system coupled to the data storage system and the ports. The data storage system stores (i) a data structure for mapping each one of a set of one or more layer 2 addresses to a port of the network device and (ii) an hello-timer value (ht) that defines the interval between periodic transmissions of configuration messages.

Advantageously, the layer 2 network device is configured such that, after a port of the layer 2 network device is activated, the layer 2 network device: (1) transmits onto a local area network (LAN) to which the port is connected a proposal message (e.g., a Rapid Spanning Tree (RST) Bridge Protocol Data Unit (BPDU) in which the proposal flag is set); and (2) transmits the proposal message onto the LAN at time T1 if by that time the network device has not received, from a second layer 2 network device, a response to the proposal message, wherein T1−Ts<ht and Ts is the time at which the transmission of the proposal message occurred.

In some embodiments, the data storage system is configurable to store a function f(i), where f(i)<ht for i=0 ... M, M being greater than or equal to zero, and T1=(Ts+f(i=x)), x being greater than or equal to zero but less than or equal to M. In some embodiments, the layer 2 network device is configured such that, after time T1, the layer 2 network device transmits at time T2 the proposal message if by that time the layer 2 network device has not received, from a second layer 2 network device, a response to the proposal message, wherein T2=(Ts+f(i=y)), wherein f(i=y)>=f(i=x) and f(i=y) is less than ht. f(i) may be an exponential function for i=0 ... M.

In some embodiments, the L2D is further configured such that, in response to the port of the layer 2 network device being activated, the layer 2 network device: (1) puts the port in a discarding state with a role of designated; (2) generates the proposal message; (3) transmits onto the LAN to which the port is connected the proposal message, the transmission of the proposal message occurring at time Ts; and (4) transmits the proposal message onto the LAN at time T1 if by that time the layer 2 network device has not received, from a second layer 2 network device, a response to the proposal message, wherein T1 minus Ts is less than ht.

In one aspect, the invention provides a method for fast retransmission of proposal messages. Such a method according to some embodiments includes the following steps: storing one or more configuration parameters, the one or more configuration parameters including an hello-timer value (ht); placing the port in a discarding state, generating a proposal message (e.g., a proposal RST BPDU); transmitting, at time Ts, the proposal message onto a local area network (LAN) to which the port is connected; transmitting the proposal message onto the LAN at time T1 if by that time the network device has not received a response to the proposal message, wherein (T1−Ts)<ht; and changing the state of the port from the discarding state to a forwarding state in response to receiving an agreement message that was sent in response to the proposal message. In some embodiments, T1−Ts<0.5 seconds.

In one aspect, the invention provides a computer program product for fast retransmission of proposal messages. In some embodiments, the computer program product includes a computer readable medium storing computer readable program code, and the computer readable program code includes: a set of instructions for generating a proposal message; a set of instructions for transmitting the proposal message; a set of instructions for keeping a count (c) of the number of times the proposal message has been transmitted; a set of instructions for activating a timer when the proposal message is transmitted, the instructions being configured to configure the timer such that the timer will expire at time Ts+f(i), where Ts is the time at which the proposal message was first transmitted, and i is a function of c and wherein f(i)<a hello-timer value (ht) for i=0 . . . M; a set of instructions for transmitting the proposal message in response to the timer expiring; and a set of instructions for deactivating the timer in response to receipt of a response to the proposal message so that the proposal message will not be transmitted again in the event a response is received.

In some embodiments, the computer readable program code further includes (i) instructions for activating a second timer when the proposal message is transmitted the first time, where the second timer is configured such that the timer will expire at time Ts+ht, and (ii) instructions for generating a configuration message and for transmitting the configuration message in response to the second timer expiring.

The above and other aspects and embodiments are described below with reference to the accompanying drawings.

BRIEF DESCRIPTION OF THE DRAWINGS

The accompanying drawings, which are incorporated herein and form part of the specification, illustrate various embodiments of the present invention and, together with the description, further serve to explain the principles of the invention and to enable a person skilled in the pertinent art to make and use the invention. In the drawings, like reference numbers indicate identical or functionally similar elements.

DETAILED DESCRIPTION

Figure 1:
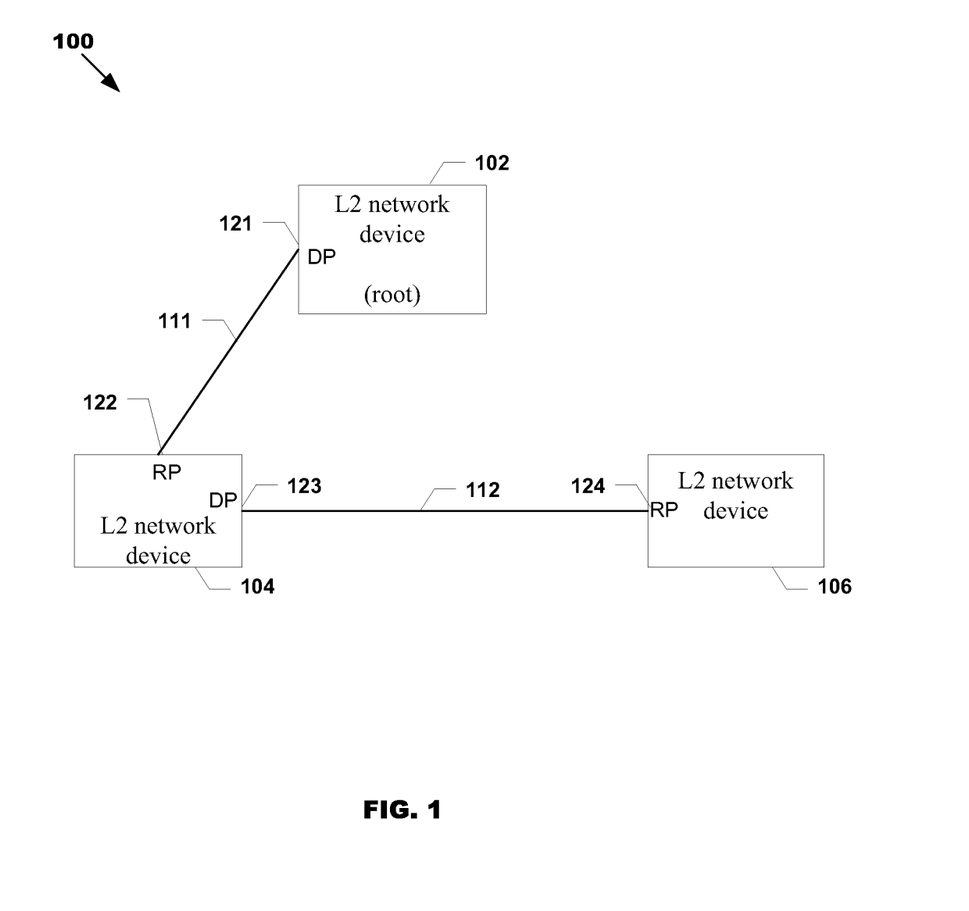
FIGS. 1-3 illustrate an example network in which the invention may be practiced.

Referring now to FIG. 1, FIG. 1 illustrates a network 100 that includes three layer 2 network devices (L2Ds) connected via LANs 111, and 112 (in the example shown, LANs 111 and 112 are point-to-point links, but this is not a requirement). As shown in FIG. 1, L2D 102 is the designated "root" L2D and it has a port 121 that is connected to LAN 111. Port 121 of L2D 102 is shown as being a designated port (DP). L2D 104 has two ports, a root port (RP) 122 connected to LAN 111 and a DP 123 connected to LAN 112. L2D 106 has an RP 124 connected to LAN 112.

Figure 2:
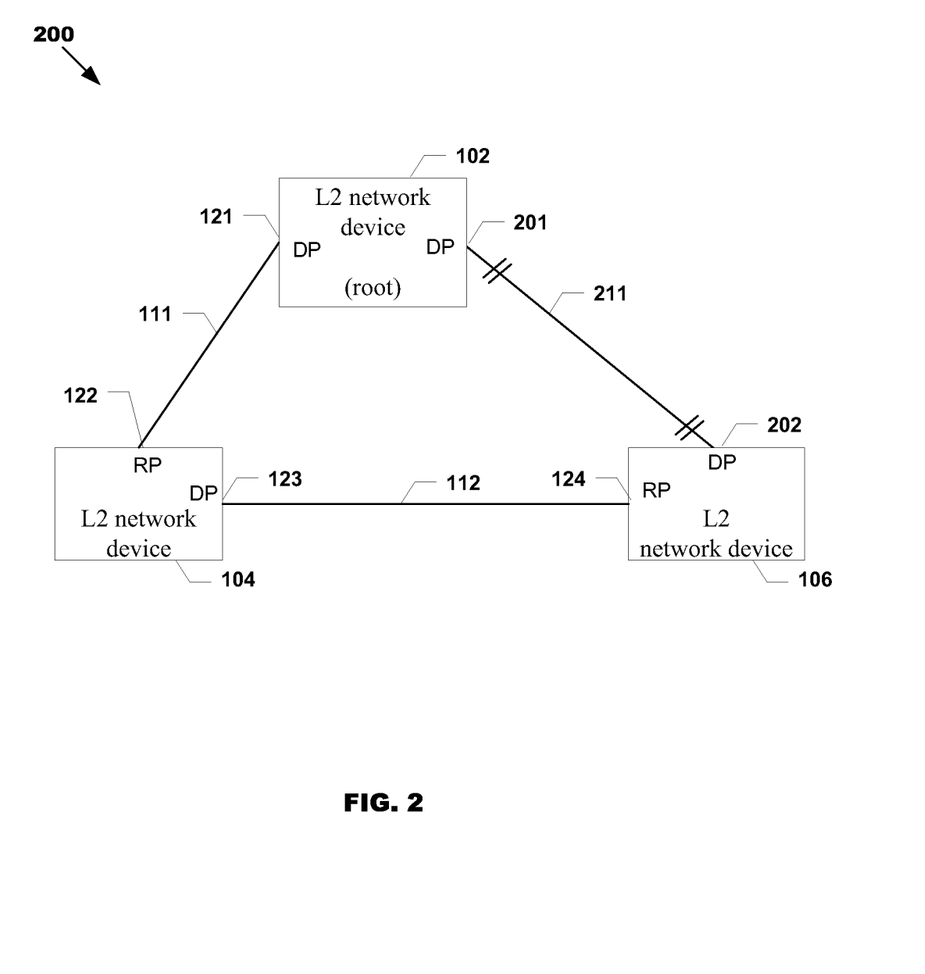

Referring now to FIG. 2, FIG. 2 shows that a new LAN (i.e., LAN 211) is being added to network 100. More specifically, as shown, a port 201 of L2D 102 is physically connected to LAN 211 and a port 202 of L2D 106 is also physically connected to LAN 211. After the ports are physically connected to LAN 211, the ports are activated, manually or automatically. In response to the activation, the ports will each have a role of designated (i.e., each port will be a DP) and will have a state of discarding, as shown in FIG. 2.

Figure 3:
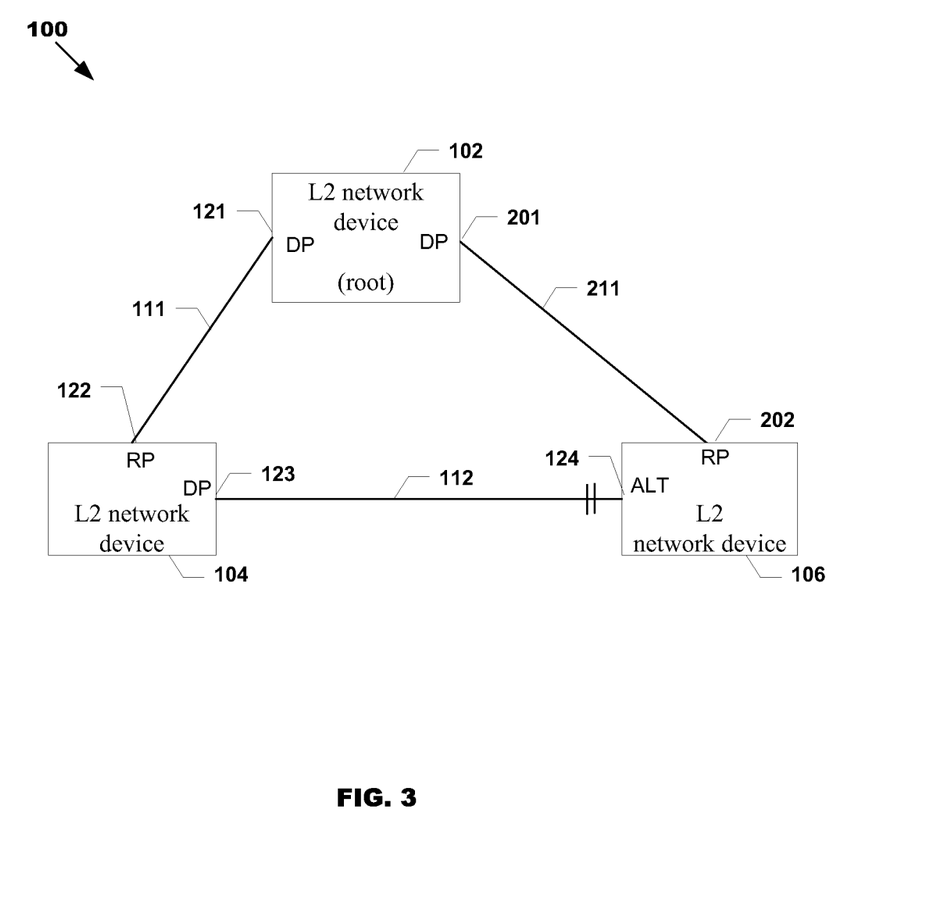

In accordance with the RSTP, L2D 102 should transmit, via port 201, a proposal RST BPDU onto LAN 211 and L2D 106 should respond to this proposal RST BPDU by synchronizing its other ports (i.e., port 124 in this example) and then transmit, via port 202, an agreement RST BPDU (i.e., a RST BPDU that has the agreement flag set). FIG. 3 shows the state of the network after L2D 106 transmits the agreement RST BPDU. As shown, port 202 is now an RP and is in the forwarding state, whereas port 124 is now in the discarding state. As discussed above, the proposal RST BPDU (or agreement RST BPDU) may not be received by L2Ds 106 and 102, respectively, which will delay the devices from transitioning ports 202 and 201, respectively, to the forwarding state. To minimize this delay, L2D 102 may perform the process shown in FIG. 4.

Figure 4:
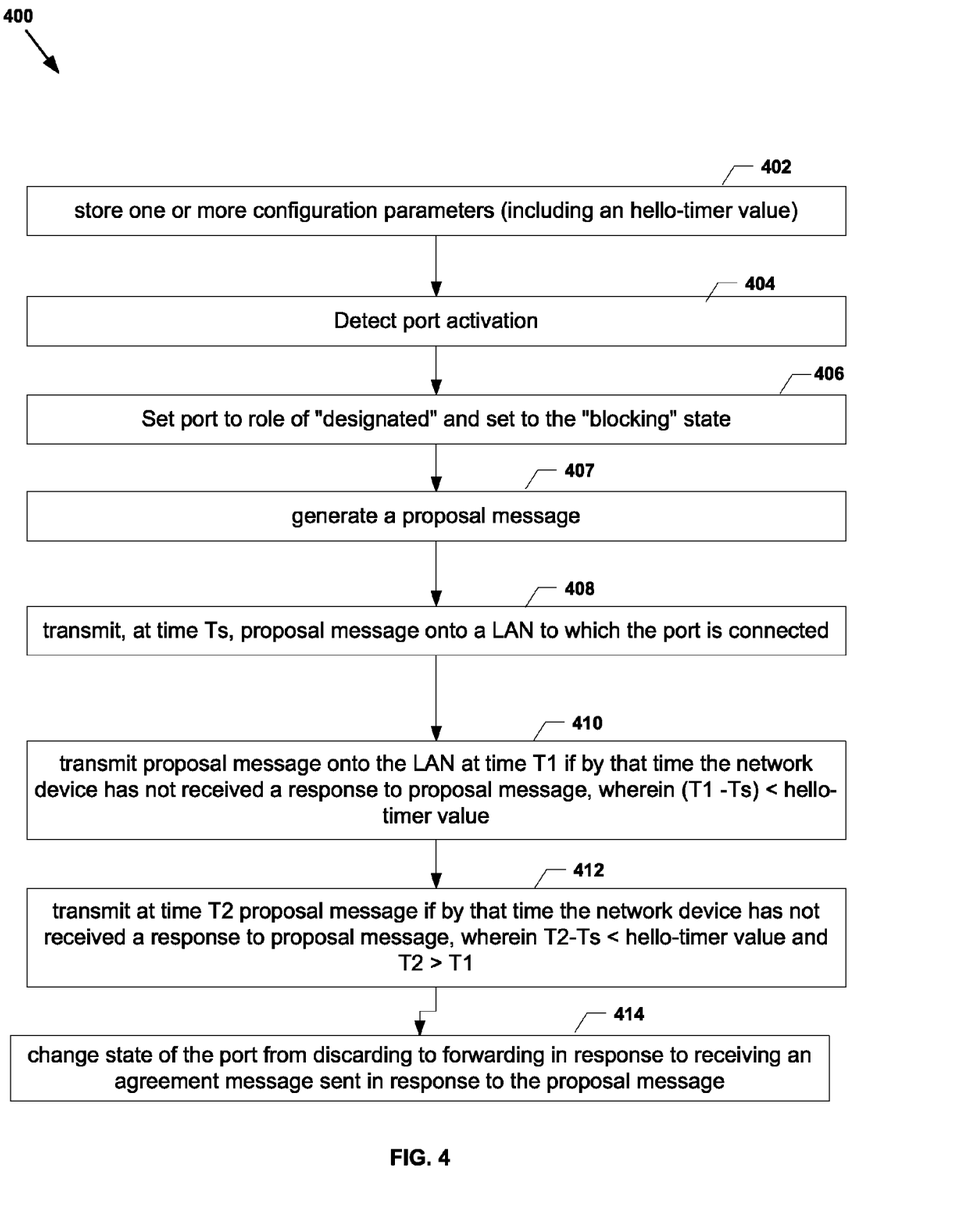
FIG. 4 is a flow chart illustrating a process according to an embodiment of the invention.

Referring now to FIG. 4, FIG. 4 illustrates a process 400, according to an embodiment of the invention, for fast retransmission of proposal messages (e.g., a proposal RST BPDU). As used herein, a "proposal message" is a message sent by a device such that when the device receives a particular response to the proposal message the device will modify the state of an entity (e.g., a port) controlled by the device. As shown in FIG. 4, process 400 may begin in step 402, where L2D 102 stores one or more configuration parameters, including, for example, one or more timer values, which may include an hello-timer value that corresponds with the Bridge Hello Time defined in the RSTP standard (e.g., the hello-timer value falls in the range of 1.0-2.0 seconds). That is, the hello-timer value may define the interval between periodic transmissions of configuration messages such as, for example, Configuration Messages defined in the RSTP standard.

In step 404, L2D 102 may detect the activation of port 201. In response to detecting this event, L2D 102 sets port 201 to a particular state (e.g., the designated discarding state) (step 406), generates a proposal message (step 407) (e.g., a proposal RST BPDU), and transmits the proposal message onto the LAN to which port 201 is connected (step 408). We shall assume that step 408 occurred at time Ts. In step 409, L2D 102 sets a hello-timer to expire when an amount of time equal to the hello-timer value has elapsed since time Ts.

In step 410, L2D 102 will transmit the proposal message on to the LAN at time T1 if by that time the network device has not received a response to the proposal message, where (T1−Ts) is less than the hello-timer value. In step 412, L2D 102 will transmit the proposal message on to the LAN at time T2 if by that time the network device has not received a response to the proposal message, where (T2−Ts) is less than the hello-timer value and T2>T1. In this way, L2D 102 will retransmit the proposal message one or more times without waiting for the hello-timer to expire. Thus, advantageously, if the proposal message transmitted at time Ts is lost (or the agreement message sent by L2D 106 is lost), L2D 102 has an opportunity to transition port 201 to the forwarding state prior to the expiration of the hello-timer.

In step 414, L2D 102 changes state of the port from the discarding state to the forwarding state in response to receiving an agreement message sent in response to the proposal message.

Figure 5:
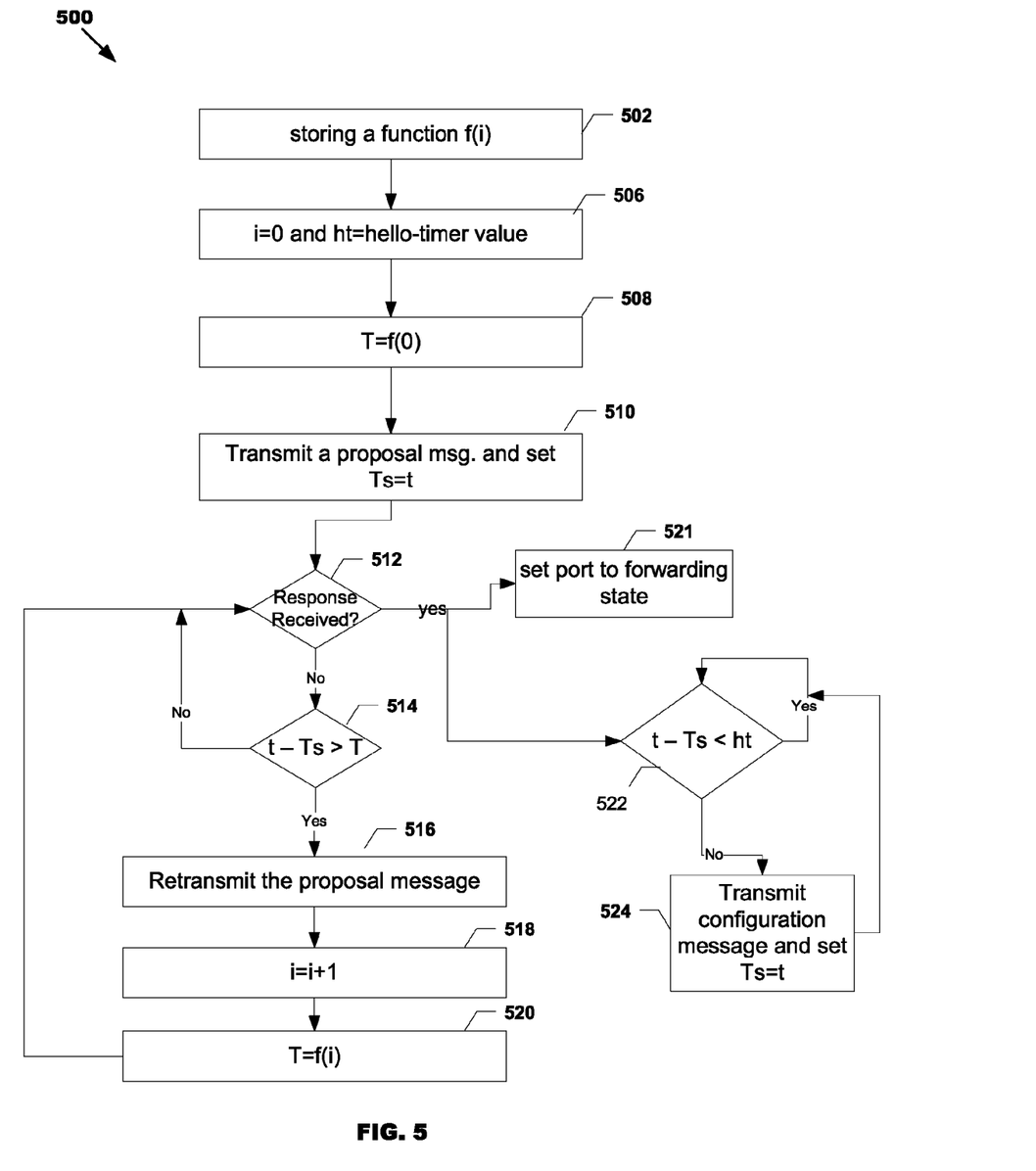
FIG. 5 is a flow chart illustrating processes, according to an embodiment of the invention, for implementing certain steps shown in FIG. 4.
Figure 6:
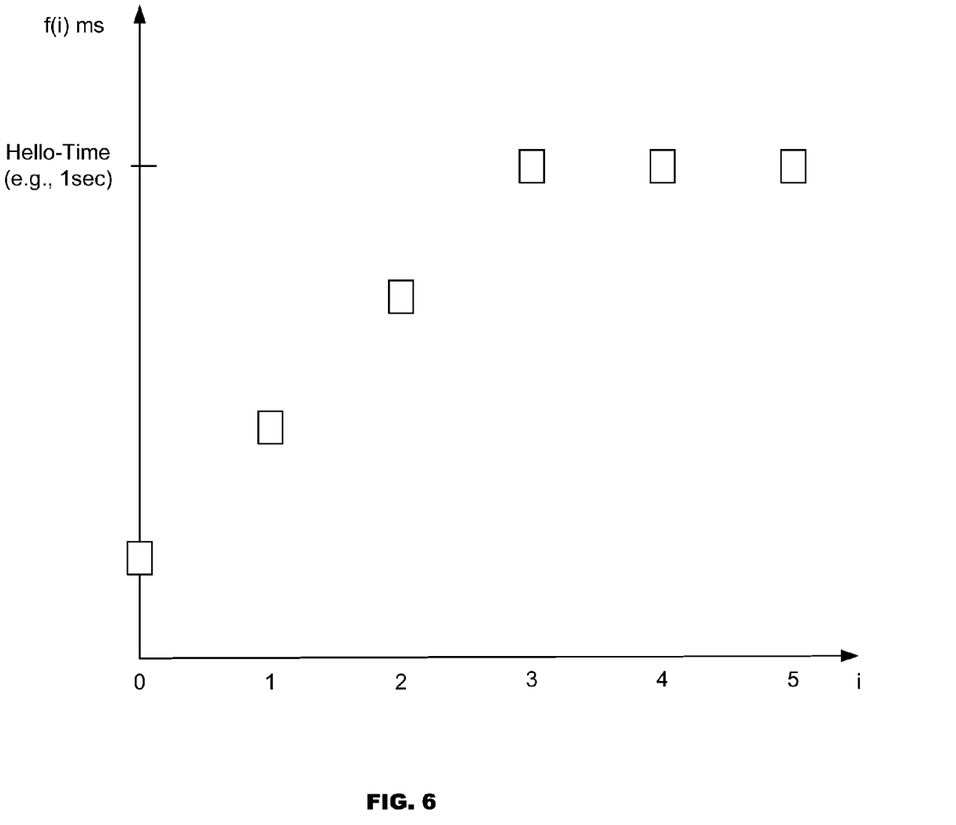
FIGS. 6-7 illustrate example functions that can be used to set the time at which a proposal message is retransmitted.
Figure 7:
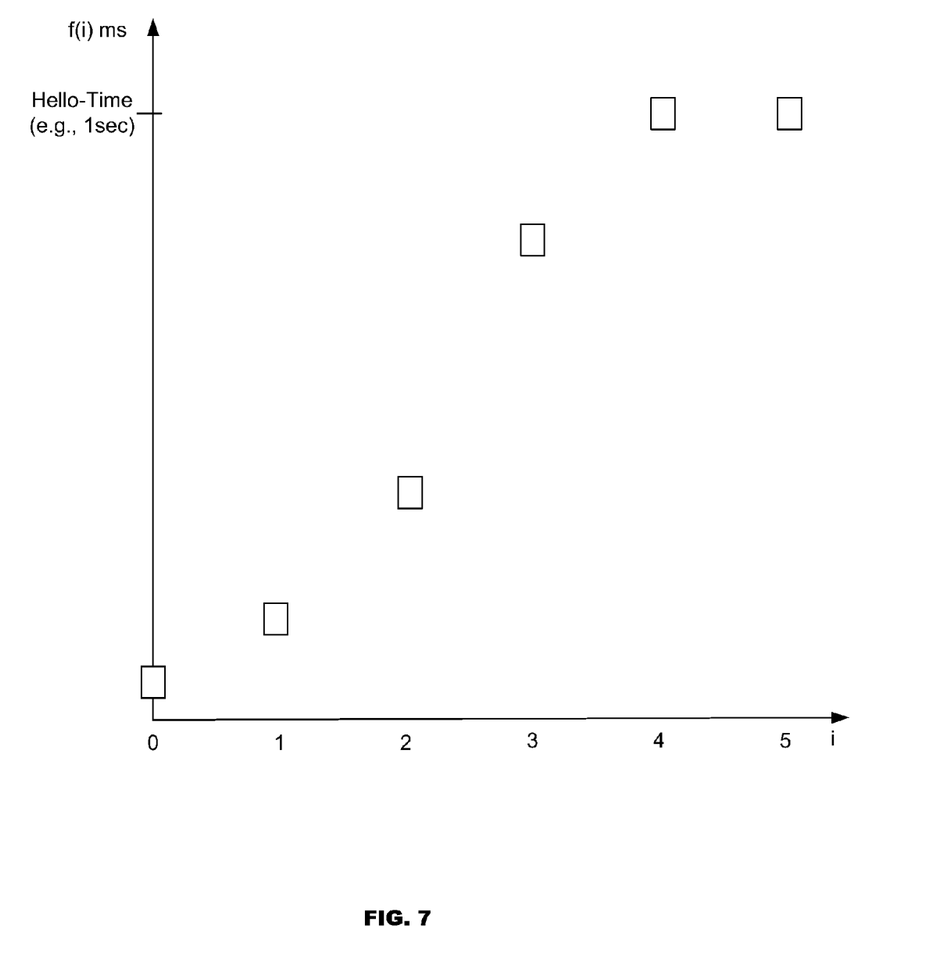

Referring now to FIG. 5, FIG. 5 is a flow chart illustrating a process 500 that may be performed by L2D 102 to implement steps 408 to 412. Process 500 may begin in step 502, where L2D 102 stores a function f(i). FIGS. 6 and 7 illustrate two examples of function f(i). Storing function f(i) may consist of storing a data structure (e.g., a table) that maps an index value to a function value, as illustrated in Table 1 below, or it may consists of storing an equation that represents the function (e.g., $f(i)=2^i \times 100$ for i=0, 1, 2 and f(i)=hello-timer value for i>2).

TABLE 1

| Index Value (i) | Function Value f(i) |
| --- | --- |
| 0 | 100 ms |
| 1 | 200 ms |
| 2 | 400 ms |
| 3 | hello-timer value |
| ... | ... |
| N | hello-timer value |

In the illustrated example, f(i) is an exponential function for i=0, 1, 2 and f(i) is a constant (i.e., the hello-timer value) for i>2. In other embodiments, f(i)=c for i=0, 1, 2, 3 and f(i)=the hello-timer value for i>3, where c<the hello-timer value. In other embodiments, f(i)=(c)(i) for i=0, 1, 2, 3, 4 and f(i)=the hello-timer value for i>4, where c is a constant.

In step 506, L2D 102 may initialize some variables (e.g., set i=0 and ht equal to the hello-timer value). In step 508, L2D 102 may set a variable T such that T=f(0). In step 510, L2D 102 may transmit a proposal message via port 201 and set a variable Ts equal to the current time ("t"). In step 512, L2D 102 may determine whether a response to the proposal message (e.g., an agreement message responding to the proposal message) has been received. If a response has been received, process 500 may proceed to step 522 (and also to step 521 if, for example, the response is an agreement message), otherwise it may proceed to step 514. In step 514, L2D 102 determines whether t−Ts>T. Using the function from Table 1 as an example, the first time step 514 is performed, L2D 102 determines whether at least 100 ms has elapsed since the proposal message was first transmitted. If t−TS>T is not true, then process 500 may return to step 512, otherwise it may proceed to step 516. In step 516, L2D 102 retransmits the proposal message via port 201. In step 518, L2D 102 may increment i. In step 520, L2D 102 may set T=f(i). Using the function from table 1, the first time step 520 is performed, T will be set to 200 ms and the next time it is performed T will be set to 400 ms. After step 520, the process may return to step 512.

In step 521, L2D 102 sets the state of port 201 to forwarding. In step 522, L2D 102 determines whether (t−Ts)<ht. If (t−Ts)<ht is true, then the process may return to step 522, otherwise it may proceed to step 524, where L2D 102 transmits a configuration message (e.g. a Configuration BPDU or RST BPDU).

Figure 8:
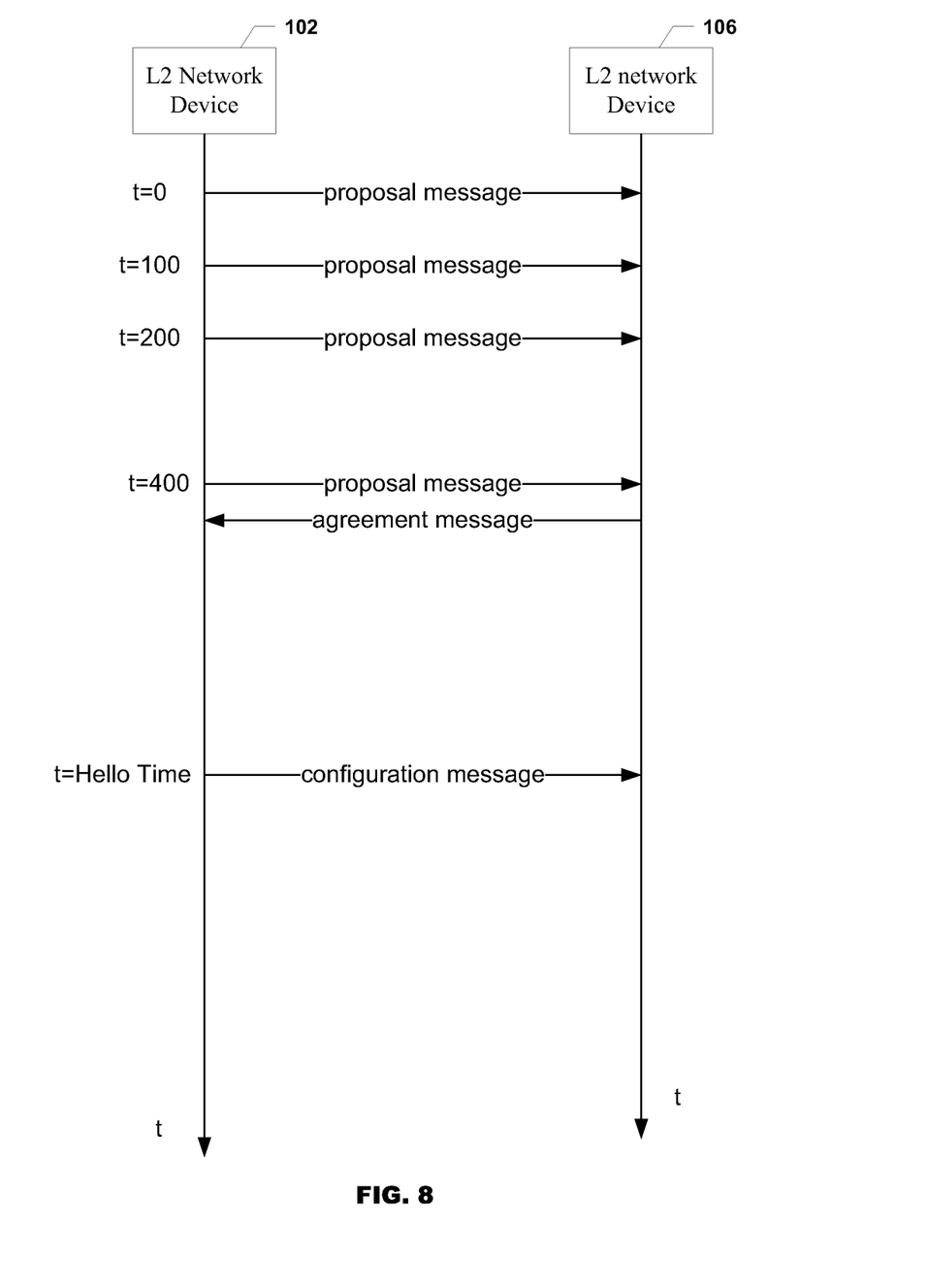
FIG. 8 is a message flow diagram illustrating an example message flow.

Referring now to FIG. 8, FIG. 8 illustrates an example data flow between L2Ds 102 and 106. The example data flow assumes L2D implements process 500 and f(i) is as shown in Table 1. As shown in FIG. 8, a time t=0, L2D 102 transmits, for the first time, a proposal message. After receiving no response by time t=100 ms, L2D retransmits the proposal message. After receiving no response by time t=200 ms, L2D again retransmits the proposal message. After still receiving no response by time t=400 ms, L2D yet again retransmits the proposal message. Finally, shortly after the 400 ms mark, L2D 106 transmits a response (e.g., an agreement RST BPDU) that is received by L2D 102. Accordingly, L2D 102 will not transmit another configuration message until Hello Time amount of time has elapsed since t=0. As can be seen, had L2D not implemented process 500, and only followed the RSTP standard, then the earliest point in time at which L2D would have received a response from L2D 106 would have been after t=Hello Time.

Figure 9:
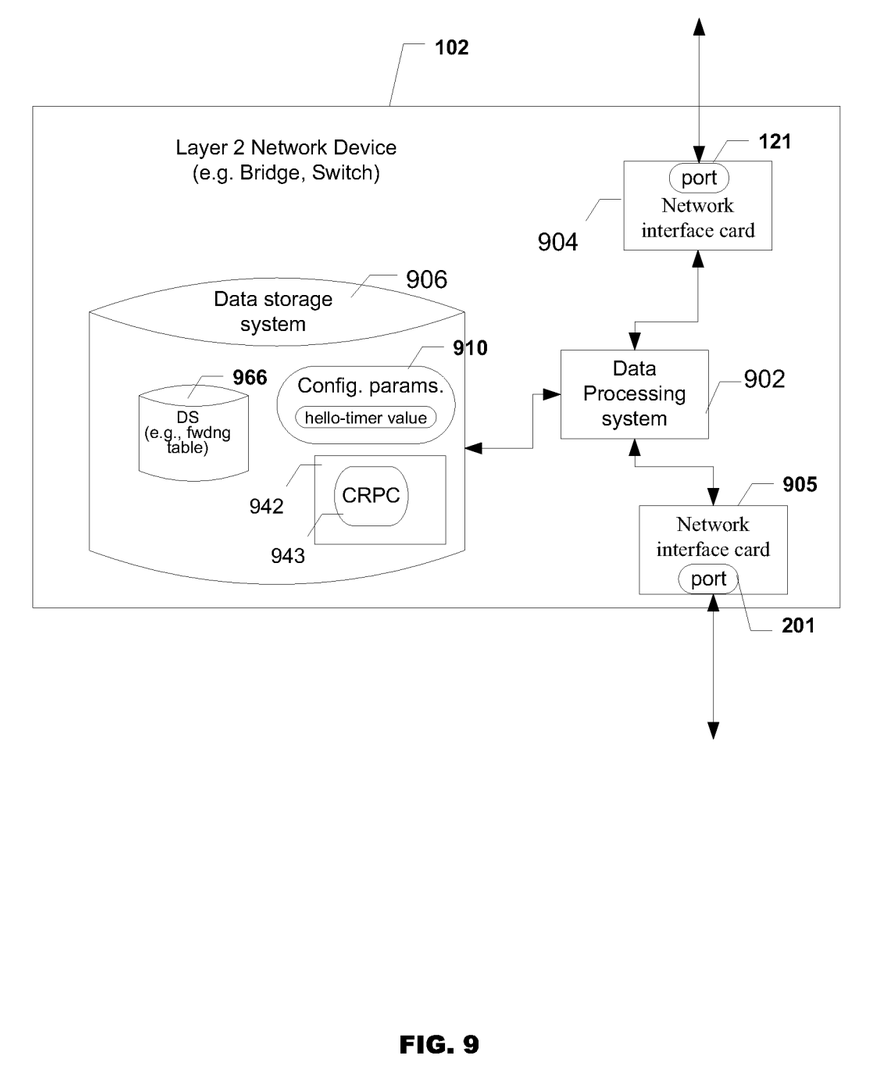
FIG. 9 is a block diagram of an apparatus according to an embodiment of the invention.

Referring now to FIG. 9, FIG. 9 illustrates a block diagram of L2D 102 according to some embodiments of the invention. As shown in FIG. 9, device 102 may include: a data processing system 902, which may include one or more microprocessors and/or one or more circuits, such as an application specific integrated circuit (ASIC), Field-programmable gate arrays (FPGAs), etc; a first network interface card 904 containing port 121; a first network interface card 905 containing port 201; a data storage system 906, which may include one or more non-volatile storage devices and/or one or more volatile storage devices (e.g., random access memory (RAM)). In embodiments where data processing system 902 includes a microprocessor, computer readable program code 943 may be stored in a computer readable medium 942, such as, but not limited to, magnetic media (e.g., a hard disk), optical media (e.g., a DVD), memory devices (e.g., random access memory), etc. Configuration parameters 910 and a data structure (DS) 966 for mapping each one of a set of one or more layer 2 addresses to one of ports 121 and 201 may also be stored by data storage system 906. In some embodiments, computer readable program code 943 is configured such that when executed, code 943 causes L2D 102 to perform steps described above (e.g., steps describe above with reference to the flow charts shown in FIGS. 4 and 5). In other embodiments, L2D 102 is configured to perform steps described above without the need for code 943. That is, for example, data processing system 902 may consist merely of one or more ASICs. Hence, the features of the present invention described above may be implemented in hardware and/or software.

Figure 10:
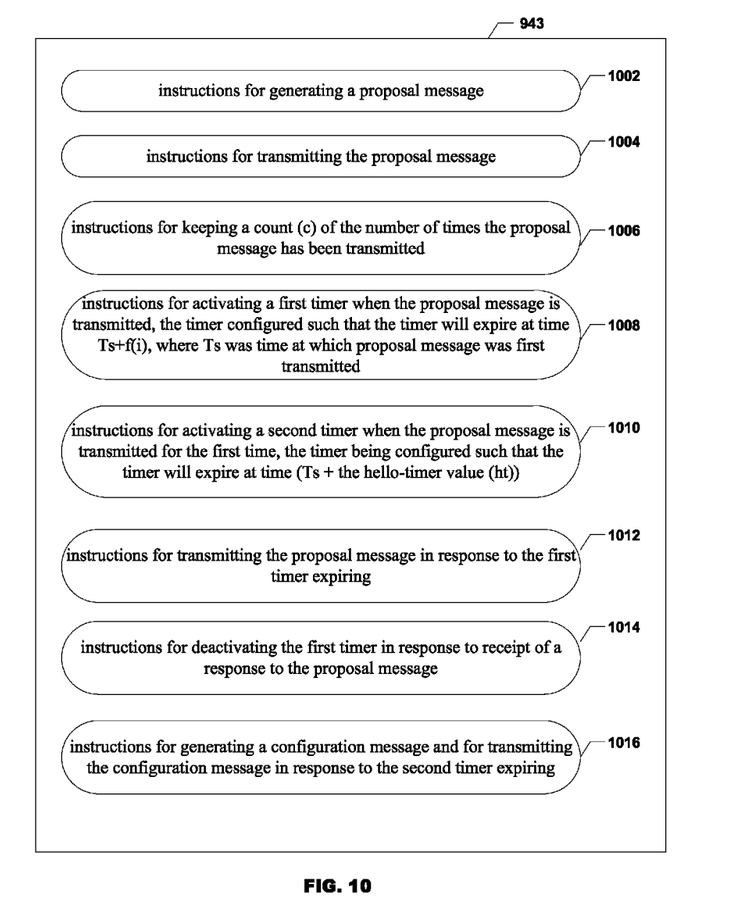
FIG. 10 is a block diagram illustrating example software components according to an embodiment of the invention.

Referring now to FIG. 10, FIG. 10 illustrates an embodiment of computer readable program code (CRPC) 943. In the embodiment shown, CRPC 943 includes a set of instructions 1002 for generating a proposal message (e.g., a proposal RST BPDU). For example, instructions 1002 may be configured to cause the L2D 102 to generate the proposal message in response to activation of port 201. CRPC 943 also includes: a set of instructions 1004 for transmitting the proposal message and a set of instructions 1006 for keeping a count (c) of the number of times the proposal message has been transmitted. A set of instructions 1008 is also included. Instructions 1008 are configured to cause L2D 102 to activate a first timer when the proposal message is transmitted. Advantageously, instructions 1008 may be configured such that the timer is configured so that the timer will expire at time $Ts+f(i)$, where Ts is the time at which the proposal message was first transmitted, and i is a function of c and wherein $f(i)<$a hello-timer value for $i=0\ldots M$. CRPC 943 also includes a set of instructions 1010 for activating a second timer when the proposal message is transmitted the first time, the timer being configured such that the timer will expire at time Ts+ the hello-timer value.

CRPC 943 also includes a set of instructions 1012 for transmitting the proposal message in response to the first timer expiring; a set of instructions 1014 for deactivating the first timer in response to receipt of a response to the proposal message so that the proposal message will not be transmitted again in the event a response is received; and a set of instructions 1016 for generating a configuration message (e.g., a Configuration BPDU or RST BPDU) and for transmitting the configuration message in response to the second timer expiring.

While various embodiments of the present invention have been described above, it should be understood that they have been presented by way of example only, and not limitation. Thus, the breadth and scope of the present invention should not be limited by any of the above-described exemplary embodiments. Moreover, any combination of the above-described elements in all possible variations thereof is encompassed by the invention unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

What is claimed is:

1. A layer 2 network device configured for fast retransmission of proposal messages, comprising:
 a first port;
 a second port;
 a data storage system for storing (i) a data structure for mapping each one of a set of one or more layer 2 addresses to a port of the network device and (ii) an hello-timer value (ht) that defines the interval between periodic transmissions of configuration messages; and
 a data processing system coupled to the data storage system and the ports, wherein the layer 2 network device is configured such that, after a port of the layer 2 network device is activated, the layer 2 network device:
 (1) transmits onto a local area network (LAN) to which the port is connected a proposal message, the transmission of said proposal message occurring at time Ts; and
 (2) transmits another proposal message onto the LAN at time T1 if by that time the network device has not received, from a second layer 2 network device, a response to said proposal message, wherein $T1-Ts<ht$.

2. The layer 2 network device of claim 1, wherein
 the data storage system stores a function $f(i)$,
 $f(i)<ht$ for $i=0\ldots M$, M being greater than or equal to zero, and
 $T1=(Ts+f(i=x))$, x being greater than or equal to zero but less than or equal to M.

3. The layer 2 network device of claim 2, wherein the layer 2 network device is configured such that, after time T1, the layer 2 network device transmits at time T2 said proposal message if by that time the layer 2 network device has not received, from a second layer 2 network device, a response to said proposal message, wherein $T2=(Ts+f(i=y))$, wherein $f(i=y)>=f(i=x)$.

4. The layer 2 network device of claim 3, wherein $f(i=y)$ is less than ht.

5. The layer 2 network device of claim 4, wherein $f(i=x)=(2^x)(c)+d$ and $f(i=y)=(2^y)(c)+d$, wherein $x>=0$, $y>x$, $c>0$, and $d>=0$.

6. The layer 2 network device of claim 4, wherein the proposal message is a Rapid Spanning Tree (RST) Bridge Protocol Data Unit (BPDU) in which the proposal flag is set.

7. The layer 2 network device of claim 4, wherein the layer 2 network device is configured such that, after time T2, the layer 2 network device transmits at time T3 said proposal message if by that time the layer 2 network device has not received, from a second layer 2 network device, a response to said proposal message, wherein $T3=(Ts+f(i=z))$, wherein $f(i=z)>f(i=y)$, $f(i=z)$ is less than ht.

8. The layer 2 network device of claim 7, wherein $(T3-T2)>(T2-T1)$.

9. The layer 2 network device of claim 8, wherein $(T2-T1)=(T1-Ts)$.

10. The layer 2 network device of claim 7, wherein $(T3-T2)=(T2-T1)$.

11. The layer 2 network device of claim 1, wherein the layer 2 network device is configured such that, in response to the port of the layer 2 network device being activated, the layer 2 network device:
 (1) puts the port in a discarding state with a role of designated;
 (2) generates said proposal message;
 (3) transmits onto the LAN to which the port is connected said proposal message, the transmission of said proposal message occurring at time Ts; and
 (4) transmits said proposal message onto the LAN at time T1 if by that time the layer 2 network device has not received, from a second layer 2 network device, a response to said proposal message, wherein T1 minus Ts is less than ht.

12. The layer 2 network device of claim 1, wherein $T1-Ts<0.5$ seconds.

13. A method for fast retransmission of proposal messages, said message being performed by a layer 2 network device having a port, the method comprising:
 storing one or more configuration parameters, the one or more configuration parameters including an hello-timer value (ht) that defines the interval between periodic transmissions of configuration messages;
 placing the port in a discarding state;
 generating a proposal message;
 transmitting, at time Ts, said proposal message onto a local area network (LAN) to which the port is connected;
 transmitting another proposal message onto the LAN at time T1 if by that time the network device has not received a response to said proposal message, wherein $(T1-Ts)<ht$.

14. The method of claim 13, further comprising storing a function f(i), wherein
   f(i)<ht for i=0 ... M, M being greater than or equal to zero, and
   T1=(Ts+f(i=x)), x being greater than or equal to zero but less than or equal to M.

15. The method of claim 14, further comprising:
   transmitting at time T2 said proposal message if by that time the layer 2 network device has not received a response to said proposal message, wherein T2=(TS+f(i=y)), wherein f(i=y)>=f(i=x), and T2−Ts<ht.

16. The method of claim 15, wherein $f(i=x)=(2^x)(c)+d$ and $f(i=y)=(2^y)(c)+d$, wherein x>=0, y>x, c>0, and d>=0.

17. The method of claim 13, further comprising:
   placing the port in a discarding state; and
   changing the state of the port from the discarding state to a forwarding state in response to receiving an agreement message that was sent in response to the proposal message.

18. The method of claim 13, wherein
   the proposal message is a Rapid Spanning Tree (RST) Bridge Protocol Data Unit (BPDU) in which the proposal flag is set; and
   (T1−Ts)<0.5 seconds.

19. The method of claim 13, further comprising transmitting said proposal message onto the LAN at time T2 if by that time the network device has not received a response to said proposal message, wherein (T2−Ts)<ht.

20. The method of claim 19, wherein (T2−T1)=(T1−Ts).

21. A computer program product for fast retransmission of proposal messages, the computer program product comprising a non-transitory computer readable medium storing computer readable program code, said computer readable program code comprising:
   a set of instructions for generating a proposal message;
   a set of instructions for transmitting said proposal message;
   a set of instructions for keeping a count (c) of the number of times said proposal message or another proposal message has been transmitted;
   a set of instructions for activating a timer when said proposal message is transmitted, said instructions being configured to configure the timer such that the timer will expire at time Ts+f(i), where Ts is the time at which said proposal message was first transmitted, and i is a function of c and wherein f(i)<a hello-timer value (ht) for i=0 ... M;
   a set of instructions for transmitting said another proposal message in response to the timer expiring; and
   a set of instructions for deactivating the timer in response to receipt of a response to said proposal message or said another proposal message so that said proposal message or said another proposal message will not be transmitted again in the event a response is received.

22. The computer program product of claim 21, wherein f(i) is one of a exponential function, linear function or constant function, for i=0 ... M.

23. The computer program product of claim 21, wherein f(i) equals ht for i=M+1 ... N.

24. The computer program product of claim 21, wherein said computer readable program code further comprises instructions for activating a second timer when the proposal message is transmitted the first time, the second timer being configured such that the timer will expire at time Ts+ht.

25. The computer program product of claim 21, wherein said computer readable program code further comprises instructions for generating a configuration message and for transmitting the configuration message in response to the second timer expiring.

26. The computer program product of claim 21, wherein the proposal message is a Rapid Spanning Tree (RST) Bridge Protocol Data Unit (BPDU) in which the proposal flag is set.

* * * * *